(12) United States Patent
Ammons

(10) Patent No.: US 6,205,702 B1
(45) Date of Patent: Mar. 27, 2001

(54) ENVIRONMENTALLY SAFE INSECT CONTROL SYSTEM

(76) Inventor: Richard L M Ammons, 6265 Timothy Ct., Missoula, MT (US) 59803

(*) Notice: Subject to any disclaimer, the term of this patent is extended or adjusted under 35 U.S.C. 154(b) by 0 days.

(21) Appl. No.: 09/376,202

(22) Filed: Aug. 18, 1999

(51) Int. Cl.[7] .............................. A01M 1/20; A01M 5/02; A01M 13/00
(52) U.S. Cl. ............................................. 43/132.1; 43/124
(58) Field of Search ............................... 43/125, 126, 127, 43/128, 129, 130, 132.1, 133, 134; 239/152, 153, 154

(56) References Cited

U.S. PATENT DOCUMENTS

| | | | | |
|---|---|---|---|---|
| 73,913 | * | 1/1868 | Miles | 43/127 |
| 216,060 | * | 6/1879 | Rathbun | 43/132.1 |
| 408,514 | * | 8/1889 | Peyton | 43/132.1 |
| 556,760 | * | 3/1896 | Maddox | 43/132.1 |
| 1,534,734 | * | 4/1925 | Porter | 43/132.1 |
| 4,594,807 | * | 6/1986 | McQueen | 43/132.1 |
| 4,833,818 | * | 5/1989 | Berta | 43/124 |
| 5,419,077 | * | 5/1995 | Tombarelli | 43/132.1 |
| 5,768,907 | * | 6/1998 | Lee | 62/293 |

\* cited by examiner

*Primary Examiner*—Kurt Rowan

(57) ABSTRACT

An environmentally safe insect control system for incapacitating a nest of insects while allowing an individual to simultaneously remove the nest without utilizing toxic chemicals. The inventive device includes a telescoping tube, a carbon dioxide tank, a tube extending from the tank along the telescoping tube, a nozzle extending from the distal end of the telescoping tube for dispersing the carbon dioxide, and a capturing structure attached to the distal end of the telescoping tube and about the nozzle for capturing portions of the nest and insects. The nozzle attached to the tube preferably has a plurality of apertures within for allowing complete coverage by the carbon dioxide for incapacitating the insects within the nest. In an alternative embodiment, a ring member replaces the capturing structure for retaining a bag having a drawstring. In the alternative embodiment, a scraper is attached to the distal end of the telescoping tube for engaging and removing the nest. In the alternative embodiment, the user is able to pull upon a length of the drawstring for closing the bag about the nest of insects.

7 Claims, 3 Drawing Sheets

ENVIRONMENTALLY SAFE INSECT CONTROL SYSTEM

BACKGROUND OF THE INVENTION

1. Field of the Invention

The present invention relates generally to insect control devices and more specifically it relates to an environmentally safe insect control system for incapacitating a nest of insects while allowing an individual to simultaneously remove the nest without utilizing toxic chemicals.

Undesirable insects such as bees, hornets and wasps create "nests" in trees and building structures. It is desirable to remove these nests when they are adjacent humans because of the risk of injury to an individual. Current methods of removing the insects include spraying a toxic chemical upon the nest thereby killing the undesirable insects within and thereafter allowing an individual to physically remove the nest. These toxic chemicals are not only hazardous to the environment but also to humans that come in contact with the chemicals after being applied. Hence, there is a need for an insect control system that is environmentally friendly.

2. Description of the Prior Art

Processes of exterminating insects have been in use for years. Typically, to remove a nest of undesirable insects such as bees, wasps or hornets, toxic chemicals are often times applied to the entire nest and surrounding area in order to exterminate the undesirable insects. After the insects within the nest have been exterminated, the entire nest is then safe to remove from the building structure or tree making the surrounding environment safe for humans.

Unfortunately, utilizing toxic chemicals to exterminate insects is not safe for the environment, humans or pets. The toxic chemicals utilized can make humans and animals sick or permanently injured. In addition, toxic chemicals can damage the surrounding environment including plants and other desirable insects.

Examples of processes for exterminating insects include U.S. Pat. No. 5,165,199 to Tallon; U.S. Pat. No. 4,833,818 to Berta; U.S. Pat. No. 4,615,138 to Cale et al; U.S. Pat. No. 4,833,870 to Middleton; U.S. Pat. No. 4,835,955 to Gaubis; U.S. Pat. No. 5,347,800 to Morgan which are all illustrative of such prior art.

Tallon (U.S. Pat. No. 5,165,199) discloses a non-toxic method of exterminating insects such as termites, fleas, roaches, ants and weevils. Tallon teaches an inert freezing liquid such as liquid nitrogen as the killing agent. The liquid nitrogen is inserted so as to envelop the colony of insects.

Berta (U.S. Pat. No. 4,833,818) discloses a method of exterminating subterranean animals. Berta teaches a suffocant in the form of a heavier-than-air gas that is directed into the subterranean tunnel network of an air-breathing animal for replacing the air within the tunnels and suffocate the animals within.

Middleton (U.S. Pat. No. 4,833,870) discloses a braking mechanism for a fruit harvesting apparatus. Middleton teaches an extensible handle unit, a body attached support unit, a fruit picking unit, and a chute unit with an adjustable brake unit for allowing the fruit to be gravity fed through the chute unit.

While these devices may be suitable for the particular purpose to which they address, they are not as suitable for incapacitating a nest of insects while allowing an individual to simultaneously remove the nest without utilizing toxic chemicals. Conventional systems for removing undesirable insects include utilizing hazardous chemicals to kill the insects thereby polluting the surrounding environment. In addition, conventional insect control devices are not capable of controlling nests of insects in heightened areas.

In these respects, the environmentally safe insect control system according to the present invention substantially departs from the conventional concepts and designs of the prior art, and in so doing provides an apparatus primarily developed for the purpose of incapacitating a nest of insects while allowing an individual to simultaneously remove the nest without utilizing toxic chemicals.

SUMMARY OF THE INVENTION

In view of the foregoing disadvantages inherent in the known types of insect control devices now present in the prior art, the present invention provides a new environmentally safe insect control system construction wherein the same can be utilized for incapacitating a nest of insects while allowing an individual to simultaneously remove the nest without utilizing toxic chemicals.

The general purpose of the present invention, which will be described subsequently in greater detail, is to provide a new environmentally safe insect control system that has many of the advantages of the insect control devices mentioned heretofore and many novel features that result in a new environmentally safe insect control system which is not anticipated, rendered obvious, suggested, or even implied by any of the prior art insect control devices, either alone or in any combination thereof.

To attain this, the present invention generally comprises a telescoping tube, a carbon dioxide tank with a regulator, a tube extending from the tank along the telescoping tube, a nozzle extending from the distal end of the telescoping tube for dispersing the carbon dioxide, and a capturing structure attached to the distal end of the telescoping tube and about the nozzle for capturing portions of the nest and insects, and providing a bowl to catch the falling carbon dioxide to kill any insects falling within. The nozzle attached to the tube preferably has a plurality of apertures within for allowing complete coverage by the carbon dioxide for incapacitating the insects within the nest. In an alternative embodiment, a ring member replaces the capturing structure for retaining a bag having a drawstring. In the alternative embodiment, a scraper is attached to the distal end of the telescoping tube for engaging and removing the nest. In the alternative embodiment, the user is able to pull upon a length of the drawstring for closing the bag about the nest of insects.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an environmentally safe insect control system that will overcome the shortcomings of the prior art devices.

Another object is to provide an environmentally safe insect control system that incapacitates an entire nest of insects.

An additional object is to provide an environmentally safe insect control system that does not utilize toxic chemicals.

A further object is to provide an environmentally safe insect control system that is safe for the environment, humans and animals.

Another object is to provide an environmentally safe insect control system that is capable of exterminating nests of insects at extreme heights.

A further object is to provide an environmentally safe insect control system that removes oxygen from around the insects thereby incapacitating and eventually exterminating the insects.

An additional object is to provide an environmentally save insect control system that significantly drops the temperature of the air surrounding and within the nest thereby incapacitating the insects.

Another object is to provide an environmentally safe insect control system that utilizes carbon dioxide to displace the air surrounding a nest thereby removing the oxygen from the nest.

An additional object is to provide an environmentally safe insect control system that allows simultaneous retrieval of the nest after incapacitating the nest of insects.

Another object is to provide an environmentally safe insect control system that is capable of receiving frozen carbon dioxide (dry ice) for applying cold to the nest.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
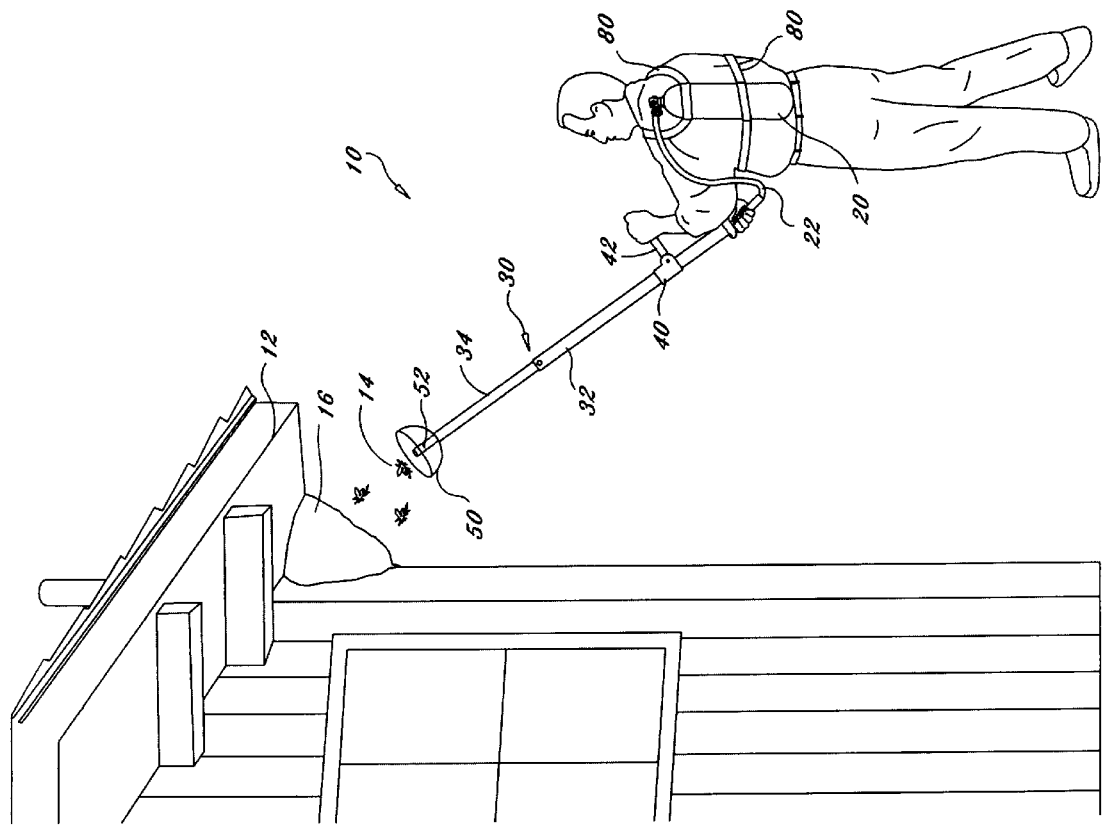
FIG. 1 is an upper perspective view of the present invention being utilized to spray an insect nest with carbon dioxide.
Figure 2:
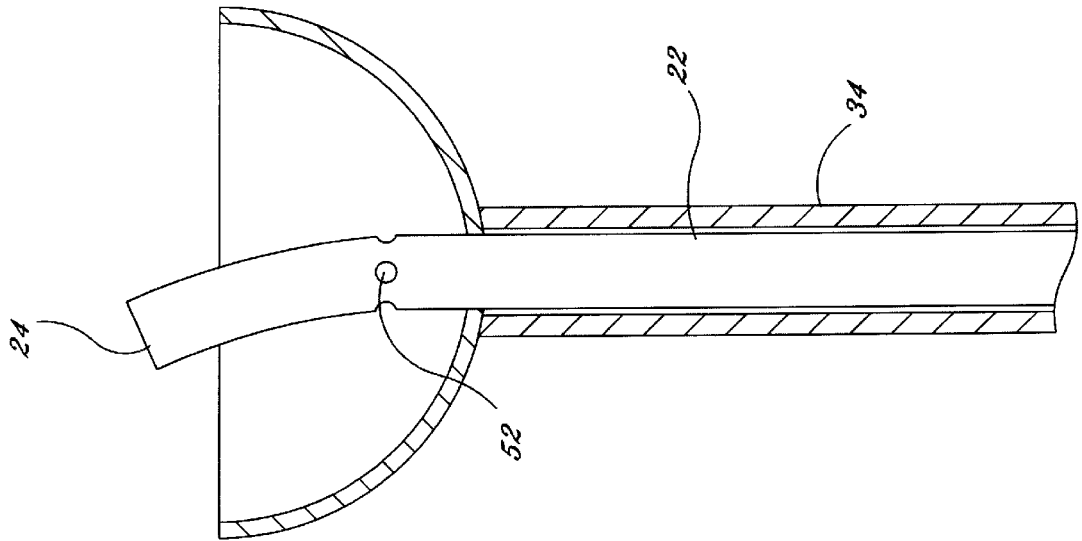
FIG. 2 is a cutaway view of the capturing structure.
Figure 3:
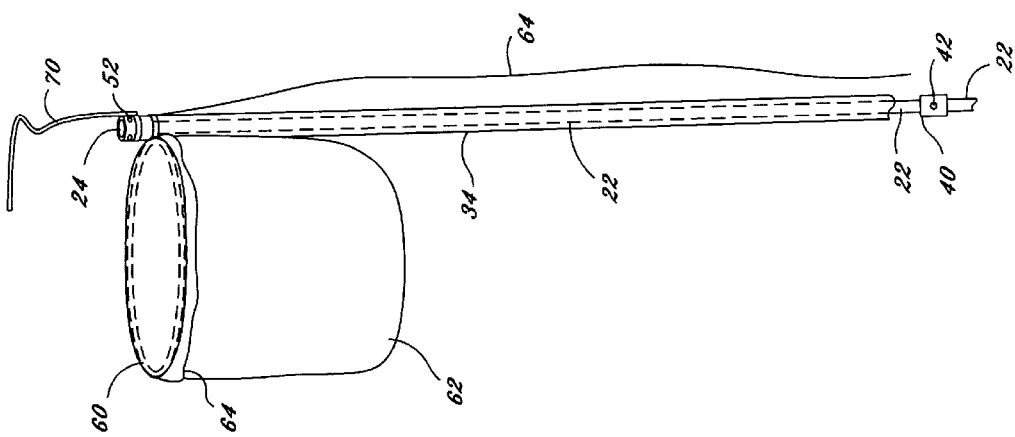
FIG. 3 is an upper perspective view of an alternative embodiment of the present invention.

Turning now descriptively to the drawings, in which similar reference characters denote similar elements throughout the several view, FIGS. 1 through 3 illustrate an environmentally safe insect control system 10, which comprises a telescoping tube 30, a carbon dioxide tank 20, a tube 22 extending from the tank 20 along the telescoping tube 30, a nozzle 24 extending from the distal end of the telescoping tube 30 for dispersing the carbon dioxide, and a capturing structure 50 attached to the distal end of the telescoping tube 30 and about the nozzle 24 for capturing portions of the nest 16 and insects 14. The nozzle 24 attached to the tube 22 preferably has a plurality of apertures 52 within for allowing complete coverage by the carbon-dioxide for incapacitating the insects 14 within the nest 16. In an alternative embodiment, a ring member 60 replaces the capturing structure 50 for retaining a bag 62 having a drawstring 64. In the alternative embodiment, a scraper 70 is attached to the distal end of the telescoping tube 30 for engaging and removing the nest 16. In the alternative embodiment, the user is able to pull upon a length of the drawstring 64 for closing the bag 62 about the nest 16 of insects 14.

As best shown in FIG. 1 of the drawings, the telescoping tube 30 is an elongated structure having a plurality of tubular members slidably connected and extensible with respect to one another. The telescoping tube 30 has a lower portion 32 and an upper portion 34, wherein the user grasps the lower portion 32 during operation. A valve 40 having a handle 42 is connected to the lower portion 32 of the telescoping tube 30 for allowing the user to control the flow of carbon dioxide.

As shown in FIG. 1 of the drawings, a tank 20 containing pressurized carbon dioxide is attachable to a user by a plurality of straps. The tank 20 is fluidly connected to a length of tube 22 that extends within the telescoping tube 30. The valve 40 is fluidly connected within the length of tube 22 for allowing control of the flow of carbon dioxide.

As shown in FIGS. 1 and 2 of the drawings, a capturing structure 50 is attached to the distal end of the upper portion 34. The capturing structure 50 is a bowl-like structure for receiving portions of the nest 16 and falling insects 14 during use. The capturing structure 50 is preferably comprised of a transparent or semi-transparent material for allowing viewing by the user.

As further shown in FIG. 2 of the drawings, a nozzle 24 extends from the distal end of the tube 22 for dispensing the carbon dioxide onto and into the nest 16. The nozzle 24 extends a finite distance within the capturing structure 50 as shown in FIG. 2 of the drawings. The nozzle 24 preferably includes a plurality of apertures 52 within for allowing complete coverage of the carbon dioxide within the capturing structure 50 and in the nest entrance and about the nest 16.

In using the present invention, the user manipulates the valve 40 for allowing dispensing of the carbon dioxide through the tube 22 into the nozzle 24. The nozzle 24 broadly disperses the carbon dioxide through the apertures 52 and through the distal end for engulfing the nest 16 with the carbon dioxide. Because the carbon dioxide when released is extremely cold and displaces the air surrounding the nest 16, the insects 14 within and about the nest 16 become incapacitated and are exterminated. The capturing structure 50 captures the incapacitated insects 14 and portions of the nest 16 during removal thereby preventing the insects 14 and debris from falling upon the user. When the user is finished, the user manipulates the valve 40 for terminating the flow of carbon dioxide through the nozzle 24.

In an alternative embodiment of the present invention shown in FIG. 3 of the drawings, the basic structure of the preferred embodiment is maintained except for the capturing structure 50. In the alternative embodiment, the capturing structure 50 is replaced with a ring member 60 that extends from the upper portion 34 of the telescoping tube 30. A bag 62 having a drawstring 64 is attached to the ring for capturing the insects 14 and the nest 16 during removal. In addition, a scraper 70 is preferably attached to the upper portion 34 of the telescoping tube 30 for engaging the nest 16 thereby removing the nest 16 from the building structure 12 or tree. The drawstring 64 preferably extends along the pole for allowing the user to manually pull the drawstring 64 for selectively closing the bag 62 about the nest 16 and insects 14 after removal thereby preventing the escape of the insects 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| ENVIRONMENTAL ELEMENTS |
| --- |
| 10. Environmentally Safe Insect Control System |
| 11. |
| 12. Building Structure |
| 13. |
| 14. Insects |
| 15. |
| 16. Nest |
| 17. |
| 18. |
| 19. |
| 20. Tank |
| 21. |
| 22. Tube |
| 23. |
| 24. Nozzle |
| 25. |
| 26. |
| 27. |
| 28. |
| 29. |
| 30. Telescoping Tube |
| 31. |
| 32. Lower Portion |
| 33. |
| 34. Upper Portion |
| 35. |
| 36. |
| 37. |
| 38. |
| 39. |
| 40. Valve |
| 41. |
| 42. Handle |
| 43. |
| 44. |
| 45. |
| 46. |
| 47. |

| -continued |
| --- |
| ENVIRONMENTAL ELEMENTS |
| 48. |
| 49. |
| 50. Capturing Structure |
| 51. |
| 52. Apertures |
| 53. |
| 54. |
| 55. |
| 56. |
| 57. |
| 58. |
| 59. |
| 60. Ring Member |
| 61. |
| 62. Bag |
| 63. |
| 64. Drawstring |
| 65. |
| 66. |
| 67. |
| 68. |
| 69. |
| 70. Scraper |
| 71. |
| 72. |
| 73. |
| 74. |
| 75. |
| 76. |
| 77. |
| 78. |
| 79. |

I claim:

1. An environmentally safe insect control system, comprising:

a telescoping tube having a lower portion and an upper portion;

a ring member attached to said telescoping tube, wherein said ring member receives a removable bag for capturing debris;

a tank for storing a volume of oxygen displacing gas;

a tube fluidly connected to said tank and attached within said telescoping tube; and a nozzle extending from said tube opposite of said tank for dispersing said volume of gas.

2. The environmentally safe insect control system of claim 1, wherein said nozzle includes a plurality of nozzles extending radially there from.

3. The environmentally safe insect control system of claim 1, including a valve fluidly connected to said tube.

4. The environmentally safe insect control system of claim 1, wherein said tank includes an attachment means for securing to a user.

5. The environmentally safe insect control system of claim 1, wherein said tube extends longitudinally within said telescoping tube.

6. The environmentally safe insect control system of claim 1 including a scraper attached to said telescoping tube.

7. The environmentally safe insect control system of claim 1 wherein said bag includes a drawstring for allowing a user to manually close said bag while surrounding a nest.

\* \* \* \* \*